US009128965B1

(12) United States Patent
Yanacek et al.

(10) Patent No.: US 9,128,965 B1
(45) Date of Patent: Sep. 8, 2015

(54) CONFIGURABLE-CAPACITY TIME-SERIES TABLES

(71) Applicant: Amazon Technologies, Inc., Reno, NV (US)

(72) Inventors: David Craig Yanacek, Seattle, WA (US); Mohammad Zeeshan Qureshi, Toronto (CA); Jai Vasanth, Seattle, WA (US); Pejus Manoj Das, Shoreline, WA (US); Stefano Stefani, Issaquah, WA (US); Stuart Henry Seelye Marshall, Seattle, WA (US); Wei Xiao, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 210 days.

(21) Appl. No.: 13/961,778

(22) Filed: Aug. 7, 2013

(51) Int. Cl.
G06F 17/30 (2006.01)

(52) U.S. Cl.
CPC ............... G06F 17/30292 (2013.01)

(58) Field of Classification Search
CPC combination set(s) only.
See application file for complete search history.

(56) References Cited

U.S. PATENT DOCUMENTS

| 6,631,374 B1 | 10/2003 | Klein et al. |
| 8,260,783 B2 | 9/2012 | Milam |
| 8,271,566 B2 | 9/2012 | Droz et al. |
| 8,281,121 B2 | 10/2012 | Nath et al. |
| 8,335,772 B1 | 12/2012 | Ramesh et al. |
| 8,396,863 B2 | 3/2013 | Hughes |
| 8,427,478 B2 | 4/2013 | Hao et al. |
| 2012/0254174 A1 | 10/2012 | Mitra et al. |
| 2013/0060783 A1 | 3/2013 | Baum et al. |
| 2013/0103658 A1 | 4/2013 | Travis |
| 2014/0108459 A1* | 4/2014 | Gaza et al. ............... 707/792 |

* cited by examiner

Primary Examiner — Etienne Leroux
(74) Attorney, Agent, or Firm — Robert C. Kowert; Meyertons, Hood, Kivlin, Kowert & Goetzel, P.C.

(57) ABSTRACT

Methods and apparatus for configurable-capacity time-series tables are disclosed. A schedule of database table management operations, including at least an operation to change a throughput constraint associated with a table in response to a triggering event, is generated. The table is instantiated with an initial throughput constraint in accordance with the schedule. Work requests directed to the table are accepted based on the initial throughput constraint. The throughput constraint is modified in response to the triggering event. Subsequent work requests are accepted based on the modified throughput constraint.

23 Claims, 9 Drawing Sheets

FIG. 1

CONFIGURABLE-CAPACITY TIME-SERIES TABLES

BACKGROUND

Several leading technology organizations are investing in building technologies that sell "software-as-a-service". Such services provide access to shared storage (e.g., database systems) and/or computing resources to clients or subscribers. Within multi-tier e-commerce systems, combinations of different types of physical and logical resources may be allocated to subscribers and/or their applications, such as whole physical or virtual machines, CPUs, memory, network bandwidth, I/O capacity, or bundled resources such as database servers, scientific computation clusters, and the like.

In some storage-related service environments, a respective set of resources capable of supporting a desired rate of work operations may be provisioned for each storage object, such as a table or a storage volume. For example, in the case of network-accessible database services, a number of storage nodes may be established to store client database contents and to perform various types of reads, writes and other data extraction or manipulation operations on behalf of the clients. The storage nodes may each comprise one or more storage devices with respective performance characteristics. A client's data may be laid out or distributed among the storage devices and storage nodes such that, at least during normal operating conditions, a desired throughput goal and/or response time goals for reads and/or writes can be met. The desired throughput for a given storage object may be referred to as the provisioned throughput for that storage object.

The initial set of storage devices and nodes selected to store a given client's data may be based on the client's own initial estimate (or the service's estimate) of the expected workload, and/or the expected amount of data that the client expects to generate over some time period. In at least some environments clients may specify the provisioned throughput (e.g., reads per second and/or writes per second) for a storage object at the time that the storage object is created or initialized, and the resources set aside for the storage object may be determined based on the client's specifications. At least for certain kinds of applications, the manner in which clients access their data (e.g., which parts of their data are accessed more frequently than others over time, and the read-to-write ratios of such accesses) may change significantly with time, which may result in situations in which the initial workload estimates and specifications are no longer appropriate for resource management decisions.

Figure 1:
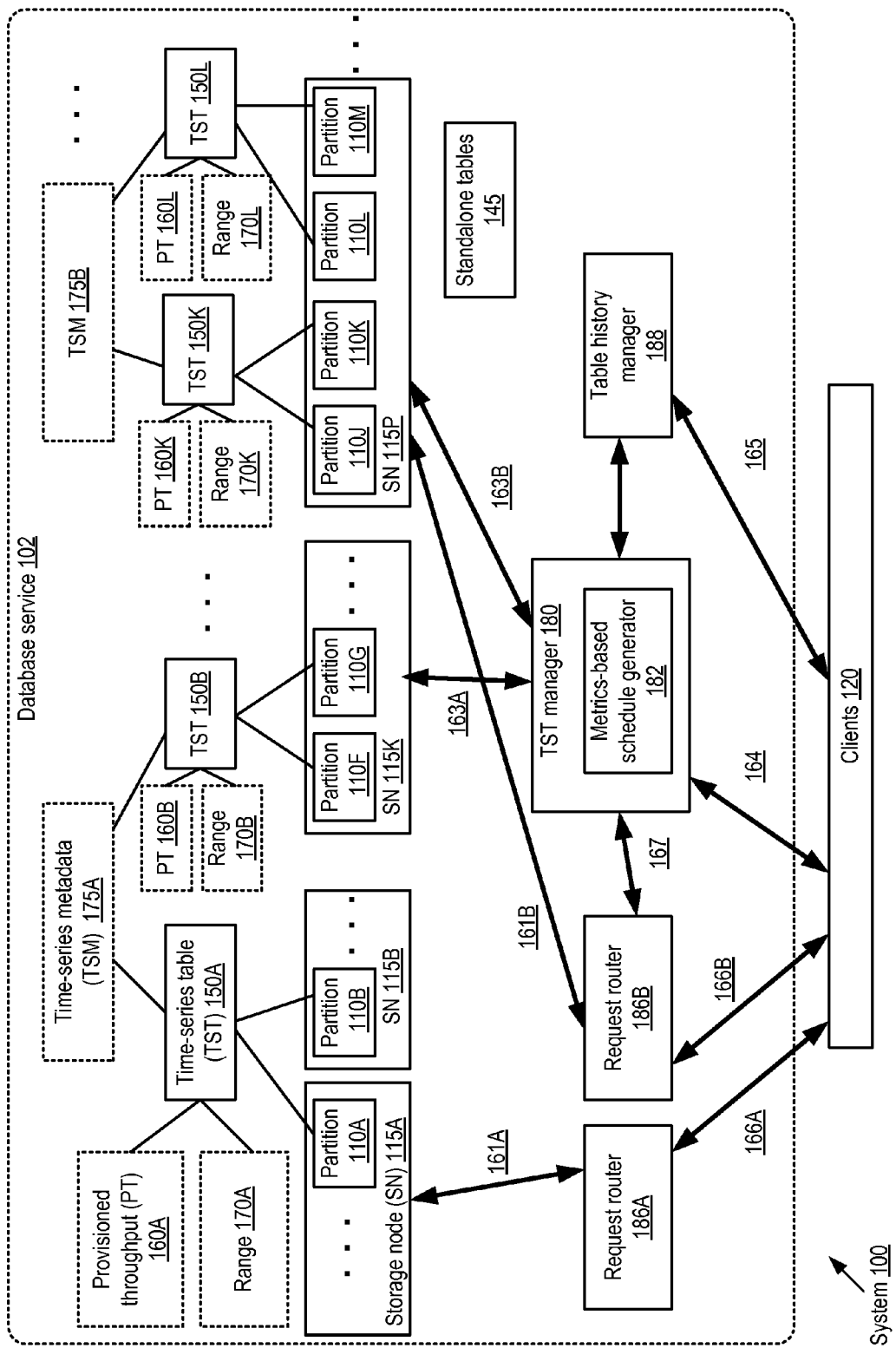
FIG. 1 illustrates an example of a system in which a plurality of time-series tables are created at a database service in accordance with a set of time-series metadata, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing configurable-capacity time-series tables are described. Networks set up by an entity such as a company or a public sector organization to provide one or more network-accessible services (such as various types of cloud-based storage, computing or database services) accessible via the Internet and/or other networks to a distributed set of clients may be termed provider networks herein. In at least some embodiments, a network-accessible multi-tenant or single-tenant database service that implements time-series tables of the kinds described below may be implemented at a provider network. In the remainder of this document, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments.

In some embodiments, a database service of a provider network may include a time-series table manager configured to create a set of related tables over time in accordance with a common set of table metadata. The table metadata may be termed "time-series metadata" or "table series metadata" herein, and the tables may be referred to as "time-series tables" or "time period tables". The tables created in accordance with the metadata may be referred to simply as a "time-series". In some embodiments, the metadata may include an indication of a schema, which may be termed a "virtual schema" or a "template schema", to be used as a guideline to determine the actual schema of the various time-series tables generated. In some such embodiments, the virtual schema may, for example, indicate a set of requirements to which the tables' schemas need to conform. The metadata may also include an indication of triggering conditions or events that influence when each of the time-series tables are created, and/or triggering conditions or events that influence when changes to various configuration settings of the time-series tables are to be made. In at least one embodiment, the configuration settings may include a throughput constraint which may be used to determine whether a given work request (such as a read or write) directed to a time-series table is to be accepted or rejected. In one implementation, the database service may support a provisioned-throughput model, according to which a given table (or each partition of a given table) has an associated provisioned throughput, indicating the rate of work requests that the table or partition is expected to support, at least during normal operating conditions. At such a provisioned-throughput database service (PTDS), the time-series metadata may indicate, for example, the initial provisioned throughput of a given time-series table, the triggering condition whose detection is to lead to the creation of the given time-series table, the triggering condition whose detection is to lead to the modification of the provisioned throughput, and what the value of the modified provisioned throughput setting is to be. A variety of different types of triggering conditions may be specified in various embodiments, including for example such simple triggering conditions as the expiration of specified amounts of time, or triggering conditions that depend upon the completion of other operations. In at least some embodiments, techniques similar to those described herein for implement time-series may also or instead be used to generate a series of tables based on other value ranges not necessarily related to time. For example, in one such embodiment a table schema specified in the metadata for the series, may include a column to store an integer value generated by a client application. In accordance with the metadata, one table may be created for rows with integer values in the range 0-10000, another for rows with integer values 10000-20000, and so on. In some embodiments multiple attributes may be used to define range boundaries for tables—e.g., a combination of geographical coordinates and temperature values may be used to determine when a new table is to be created for a climate-analysis application. It is noted that while much of the following description focuses on time-series, similar approaches may be used more generally for table series of various kinds. In addition, the types of functionality and features described below for time-series metadata may be implemented using more general table series metadata in various embodiments.

According to one example set of time-series metadata in one embodiment, a new table may be created each day of the week. For example, a table T-Monday with a schema based on a virtual schema VS1 may be created at 00:00 UTC (midnight) on a given Monday with a provisioned throughput PT1. During Monday, work requests may be accepted or rejected at T-Monday based at least in part on PT1. The application for which the time-series metadata is being used may be such that new data is typically added at some average rate X, and reads are most often directed at a recent subset of the data (e.g., most reads are directed at data that was written no more than a few days ago, while only a few reads are typically directed to older data). On Tuesday, in this example, a new table T-Tuesday may accordingly be created at 00:00 UTC, with the same schema, and with a provisioned throughput PT2. Also at 00:00 UTC on Tuesday or shortly thereafter, the provisioned throughput of T-Monday may be changed to PT3 (for example, writes may no longer be allowed at T-Monday by changing write provisioned throughput to zero, while reads may still be allowed with a non-zero read provisioned capacity). New write requests may be directed during Tuesday to T-Tuesday. Similarly, on Wednesday, another new table, T-Wednesday may be created at 00:00 UTC, and the provisioned throughputs of T-Tuesday (and/or T-Monday) may be modified yet again. Such an ability to create additional tables based on triggering events or at specified times, and to automatically modify the throughput settings or constraints of the tables thus created based on triggering events, may be very helpful in managing resources and costs for certain types of applications.

In at least some embodiments, a given database service may support several categories of tables—e.g., some tables may be initially created in accordance with time-series metadata, while other tables (which may be termed "standalone" tables, as they do not belong to a time-series) may be created without corresponding time-series metadata. In embodiments in which both time-series tables and standalone tables are implemented, a given standalone table may be converted to a time-series table, e.g., at client request or by the database service without client input. That is, metadata may be generated to start a time-series with the given standalone table as the first table of the series, or as a model or template whose schema is to be used to generate the schemas of additional tables of the time-series. Similarly, in some embodiments, a given time-series table may be converted to a standalone table, e.g., by removing any references to the given time-series table from the schedule and/or metadata of the time-series.

According to one embodiment, a schedule of table management operations to be implemented corresponding to a particular set of time-series metadata may be generated at a database service. The schedule may comprise a plurality of entries for various table management operations, including for example an operation to create an additional table whose schema is indicated by the metadata. It is noted that the schema of the additional table may not be specified in detail in the metadata in at least some embodiments; rather, one or more guidelines or rules regarding schema requirements may be specified in the metadata, as described in further detail below in the context of FIG. 5. The additional table may be intended, for example, to store data written subsequent to a detection of a first triggering condition, or to store data that meets one or more specified range conditions. The schedule may also include another operation to change a throughput setting of the additional table in response to a detection of a second triggering condition. An initial number of table partitions to store the data of the additional table and an initial throughput setting (e.g., an initial provisioned throughput) of the additional table may be determined. For example, the client on whose behalf the time-series is to be implemented may specify the expected size and performance requirements for the table, which may be used by the service to determine the initial number of partitions and the initial throughput setting. The additional table may be instantiated accordingly, e.g., by identifying the specific resources of the database service that can store the requisite amount of data expected, and provide the performance in accordance with the initial throughput setting. After the additional table is made accessible for work operations, admission control decisions for work requests directed at the table may be made in accordance with the initial throughput setting—i.e., the work requests may be accepted for execution, or rejected, based on the initial throughput setting. When the second triggering condition is detected, the throughput setting may be modified, and subsequent admission control decisions may be made in accordance with the modified throughput setting.

In different embodiments, the time-series metadata (and the time-series tables themselves) may be generated based on client preferences or requests, based on decisions made internally by the time-series table manager of the database service, or based on a combination of client requests and internal settings or decisions of the service. For example, in one embodiment, one or more programmatic interfaces may be implemented enabling clients to submit time-series table requests, in which request parameters indicate various aspects of the metadata such as the triggering conditions for various table management operations, the types of throughput settings changes, and the like. Client requests may thus be used to help generate the schedule of table management operations in some embodiments. The level of detailed guidance provided by the client regarding the properties of a given time-series may vary from one client to another, or from one time-series to another; in some cases, for example, the client may indicate that the database service is to determine the conditions under which various new tables are to be created as part of the time-series or when various configuration settings are to be changed. Additional factors such as the utilization levels of various types of resources of the provider network may also be taken into account by the service when generating the schedule. In some embodiments the triggering conditions may include results of an analysis or examination of the contents of the tables, or an analysis of one or more table properties (such as table size, number of rows in the table, and so on. Such analysis or contents-based triggers may be configured either at client request or by the database service itself. A number of different types of management operations may be incorporated into the schedule in some embodiments, including for example operations to move table data from storage devices that support one level of data durability to another, operations to back up table contents, merge data of several time-series tables, split a given time-series table into a plurality of tables, generate notifications to clients (e.g., regarding other pending or completed table management operations), perform requested types of computations on table contents, index management operations such as index creations/deletions, conditional deletions of rows from tables based on specified deletion criteria, and so on, as described below in further detail with reference to FIG. 4. Each of the various operations may be triggered by a corresponding event or condition (e.g., indicated in the metadata) in such embodiments.

In at least one embodiment, one or more table management operations may be included in the schedule based on an analysis of metrics collected at the database service—e.g., the time-series table manager may include an optimizer or another component configured to automatically generate metrics-based schedules using detected trends in read arrival rates, write arrival rates and the like. Such an optimizer may, for example, take multiple dimensions or factors into account, such as the spatial distribution of reads and writes (i.e., which portions of the data are read and written) and/or their temporal distribution (e.g., whether read and write patterns change during different time windows, especially as a function of the creation time of the data being read or written). In some implementations, a table history manager component of the service may be responsible for collecting records of various types of client-initiated and/or service-initiated table management operations, including for example when tables of various types (not necessarily just time-series tables) are created, when tables of various types are deleted, when throughput and/or other configuration settings of the tables are changed, when alerts indicating that throughput thresholds or constraints were exceeded occur, and so on. Such table history information may also be used to guide the generation of schedules for time-series tables in various embodiments. In one embodiment, programmatic interfaces enabling clients to view or query table management history, including both client-initiated table management operations and service-initiated table management operations may be implemented.

In at least some embodiments, time-series metadata may include a representation of a "virtual table". The virtual table may represent an addressable storage object, such that clients may submit work requests directed to the virtual table instead of having to directly target individual time-series tables generated in accordance with the metadata. For example, an identifier of a virtual table VT1 associated with a virtual or template schema stored in a given time-series metadata object may be provided to a client, and a number of time-series table TST1, TST2, . . . may be created in accordance with the metadata over time. At any given point in time after the virtual table has been created and exposed to clients, a work request targeted at the virtual table may be received by the database service. The work request may be redirected to a selected time-series table TSTk, e.g., based at least in part on the time at which the work request is received, or based on a time value or range indicated in the work request. For example, in one embodiment, if a virtual table VT1 was created with virtual schema VS1, and additional time-series tables TST-Monday, TST-Tuesday, etc. were created every day with schemas derived from VS1, the database service may be responsible for directing writes received on Tuesday to TST-Tuesday, and reads intended to access Monday's data to TST-Monday. In at least some embodiments, front-end nodes of the database service, which may be termed request routers, may be responsible for directing work requests submitted by clients to the appropriate partitions of the selected time-series tables (which may be located at back-end nodes of the database service and may not be directly accessible to clients), as described below in further detail. In such embodiments, the time-series table manager may be responsible for sharing information regarding the locations of the various partitions of time-series tables of a given virtual table with the front-end nodes. In at least one embodiment in which virtual tables are supported, clients may indicate either the virtual table to which a given work request is targeted, or a specific time-series table of the set of time-series tables associated with the virtual table—i.e., clients may decide whether, for any particular work request, they wish to use a specific time-series table identifier or the virtual table identifier.

It is noted that not all the tables of a particular set of time-series tables may have identical schemas in at least some embodiments. For example, in one implementation, different time-series tables may differ in their columns as long as one or more column criteria useful for making timing-related queries efficient are met, as described below. In one embodiment, one or more range key columns may be required for each row of a time-series table, where the value stored in a range key column may be expected to be indicative of the order in which writes occurred at the time-series table. Such a range key column may comprise a write timestamp or a write-time-derived value, for example, indicating when the corresponding row was created or updated.

Example System Environment

FIG. 1 illustrates an example of a system 100 in which a plurality of time-series tables are created at a database service in accordance with time-series metadata, according to at least some embodiments. As shown, system 100 includes a database service 102 that in turn comprises a time-series table (TST) manager 180 responsible for supporting scheduled table management operations as described below. Any of various types of database management systems may be implemented in different embodiments, including for example non-relational or "NoSQL" databases of various flavors, object-oriented databases, relational databases and the like. At least a portion of the database may be organized as sets of time-series tables in the depicted embodiment. For example, the database may include a plurality of time-series metadata objects (or table series metadata objects) (TSMs) 175, such as TSM 175A and TSM 175B, for respective table series. In the example illustrated in FIG. 1, TSTs 150A and 150B have been created in accordance with TSM 175A, and TSTs 150K and 150L have been created in accordance with TSM 175B. A time-series metadata object 175 may include, for example, an identifier of a virtual table (which may be used by clients to target work requests without having to identify specific TSTs), a virtual schema that is used to generate the schemas of the TSTs 150, a schedule that indicates when and in response to which triggering conditions various types of table management operations are to be performed, and so on.

Each TST 150 may have an range 170, such as a time range indicative of a period during which data included in the TST was created or last modified, or a value range for one or more attributes that may not necessarily be time-related. TST 150A is associated with range 170A, TST 150B with range 170B, TST 150K with range 170K, and TST 150L with range 170L. In an embodiment in which time ranges are used, range 170A may, for example be "01:00 UTC Jan. 2, 2013—11:00 OTC Jan. 2", 2013, while range 170B may be "11:00 UTC Jan. 2, 2013—01:00 UTC Jan. 3, 2013". In some embodiments, the ranges may be stored separately from the TSTs themselves, while in other embodiments the ranges may be implied (e.g., either by the table names/identifiers of the TSTs, or by values stored in the rows of the TSTs).

As shown, each TST 150 may in turn be organized as a set of partitions 110, such as partitions 110A and 110B of TST 150A, partitions 110F and 110G of TST 150B, partitions 110J and 110K of TST 150K, and partitions 110L and 110M of TST 150L. In implementations where ranges 170 are time ranges, each partition 110 may represent a set of rows of the corresponding TST that were created or modified during some sub-period (or all) of the time range of the TST in the depicted embodiment. Thus, rows created/modified during range 170A may be stored in partition 110A and/or partition 110B, rows created/modified during range 170B may be stored in partitions 110F and/or 110G, and so on. The number of partitions may vary from one TST to another, e.g., based on expected and/or actual data creation (write) rates. For example, an initial set of partitions may be initialized upon table creation, but more partitions may be added if the initial partitions fill up. In some implementations, partitions may be merged, combined or split. Partitions may be stored at various storage nodes (SNs) 115 of the database service, such as SN 115A, 115B, 115K or 115P. Each SN 115 may comprise one or more storage devices such as magnetic disk based devices, solid state storage devices, storage arrays of various kinds, and the like. The particular storage node 115 at which a given partition is stored may be selected by the service based on factors such as relative utilizations of different storage devices and nodes, affinity (e.g., storage node 115B may be selected to store partition 110B corresponding to TST 150A based at least in part on a proximity of SN 115B to SN 115A which was used to store partition 110A of TST 150A), similarity in performance characteristics, and the like. In some embodiments a given storage node (such as SN 115K) may be used to store partitions corresponding to a plurality of TSTs 150, e.g., either TSTs associated with a common TSM 175, or with a plurality of TSMs 175.

Each time-series table 150 may also have an associated throughput setting or constraint, such as a provisioned throughput (PT) 160 in the depicted embodiment. For example TST 150A has associated PT 160A, TST 150B has PT 160B, TST 150K has PT 160K and TST 150L has PT 160L. The provisioned throughput 160 of a TST may represent the rate at which the TST is expected to support work operations of one or more types. For example, in one implementation a PT 160 may be expressed as reads or writes per second, while in other implementation, separate provisioned throughput levels may be set for different types of work operations (such as a read PT of R reads/second, distinct from a write PT of W writes/second). The PTs for different TSTs may be set and/or modified in accordance with the corresponding TSM 175 in the depicted embodiment, e.g., by TST manager 180. In some embodiments, in addition to or instead of provisioned throughput, other throughput settings may be applied to some or all TSTs, such as burst-mode throughput constraints that govern the extent to which short-term bursts of high rates of work requests are to be supported on a best-effort basis.

Clients 120 of database service 102 may submit TST management requests (such as requests to create or alter TSMs or TSTs, or to obtain responses to queries regarding TSMs and/or TSTs) to TST manager 180 in the depicted embodiment, and to receive responses to such requests from the TST manager 180, as indicated by arrow 164. In response to client TST management requests, TST manager 180 may initiate various types of internal operations, such as initialization of TSMs, TSTs, or table partitions 110 (indicated by arrow 163A). In some embodiments, the TST manager 180 may support automated generation of schedules of table management operations based on collected metrics, e.g., instead of or in addition to using schedules specified or indicated by clients. A metrics-based schedule generator component 182 of the TST manager may be responsible for collecting metrics and using the collected data to generate such schedules on behalf of the clients. In the embodiment shown in FIG. 1, the storage nodes 115 (which may be considered back-end nodes accessible directly only by other components of the database service 102 for security reasons) may not be directly accessible to clients 120. Instead, as shown by arrows 166A and 166B, client work requests, such as reads or writes, may be directed to request routers 186 (e.g., 186A and 186B). Request routers 186 may represent front-end or client-facing nodes of the database service 102, with network addresses accessible to external clients. In response to receiving a client work request, the request routers may be responsible for identifying which specific storage node or nodes should be targeted, as indicated by arrows 161A and 161B. The TST manager 180 may notify request routers 186 regarding updated mappings between virtual tables and TST partitions (as indicated by arrow 167), so that the request routers are able to route client work requests appropriately.

When a client work request is received, admission control (the decision as to whether to accept or reject the work request) may be performed based on the PT 160 of the targeted TST and/or its partitions. In some implementations, an internal representation of the work request may be sent to one or more SNs 155, and the admission control decisions may be made at the SNs. In other implementations, the request routers themselves may be aware of the PTs 160 of various TSTs or their partitions, and as a result at least some level of admission control may be implemented at the request routers themselves. In some embodiments, admission control decisions may be implemented at the table granularity, while in other embodiments, admission control may be implemented for each partitions separately—e.g., separate provisioned throughput levels may be maintained for each partition 110.

In the depicted embodiment, a table history manager 188 of the database service may be configured to store records of various types of table management operations initiated in response to client requests, or initiated by the service itself without corresponding client requests. The table management operations tracked by table history manager 188 may include, for example, table creations, table state changes (such as the types of state changes illustrated in FIG. 4), changes to provisioned throughputs, and/or generation of alerts of various types such as alarms raised when performance or throughput thresholds are exceeded. Table history manager 188 may implement a programmatic interface or interfaces enabling clients to submit queries for table history records associated with one or more TSMs 175, TSTs 150 (and/or other tables of database service 102 that are not necessarily associated with time-series, such as standalone tables 145) in the depicted embodiment, as indicated by arrow 165. Indications of various administrative or management operations at one or more specified TSMs 175, TSTs 150 or standalone tables 145 not associated with time-series, may be provided to the clients in response to such queries.

In at least some embodiments, an existing standalone table 145 may be used to start a time-series of tables, e.g., either at client request or by the database service. For example, a new time-series metadata object 175 may be generated, using the schema of an existing standalone table 145 to determine the virtual schema, and the standalone table may be considered the first table of the time-series in some implementations. Similarly, tables may be logically removed from time-series in other implementations—i.e., references to a given TST 150 may be removed from the schedule that was originally generated for the TST in accordance with the corresponding TSM 175, and the TST 150 may thus no longer undergo scheduled state changes of the types described above.

According to one embodiment, multiple replicas of table partitions may in general be stored by the database service to achieve a desired level of durability. In some such embodiments, different numbers of replicas may be stored for respective TSTs of a given time-series—e.g., in FIG. 1, three replicas of each partition of TST 150B may be stored, while two replicas of each partition of TST 150A may be stored. Thus, different durability levels may be supported by different TSTs 150 corresponding to the same TSM 175 in at least some embodiments.

Example Sequence of Scheduled Table Management Operations

Figure 2:
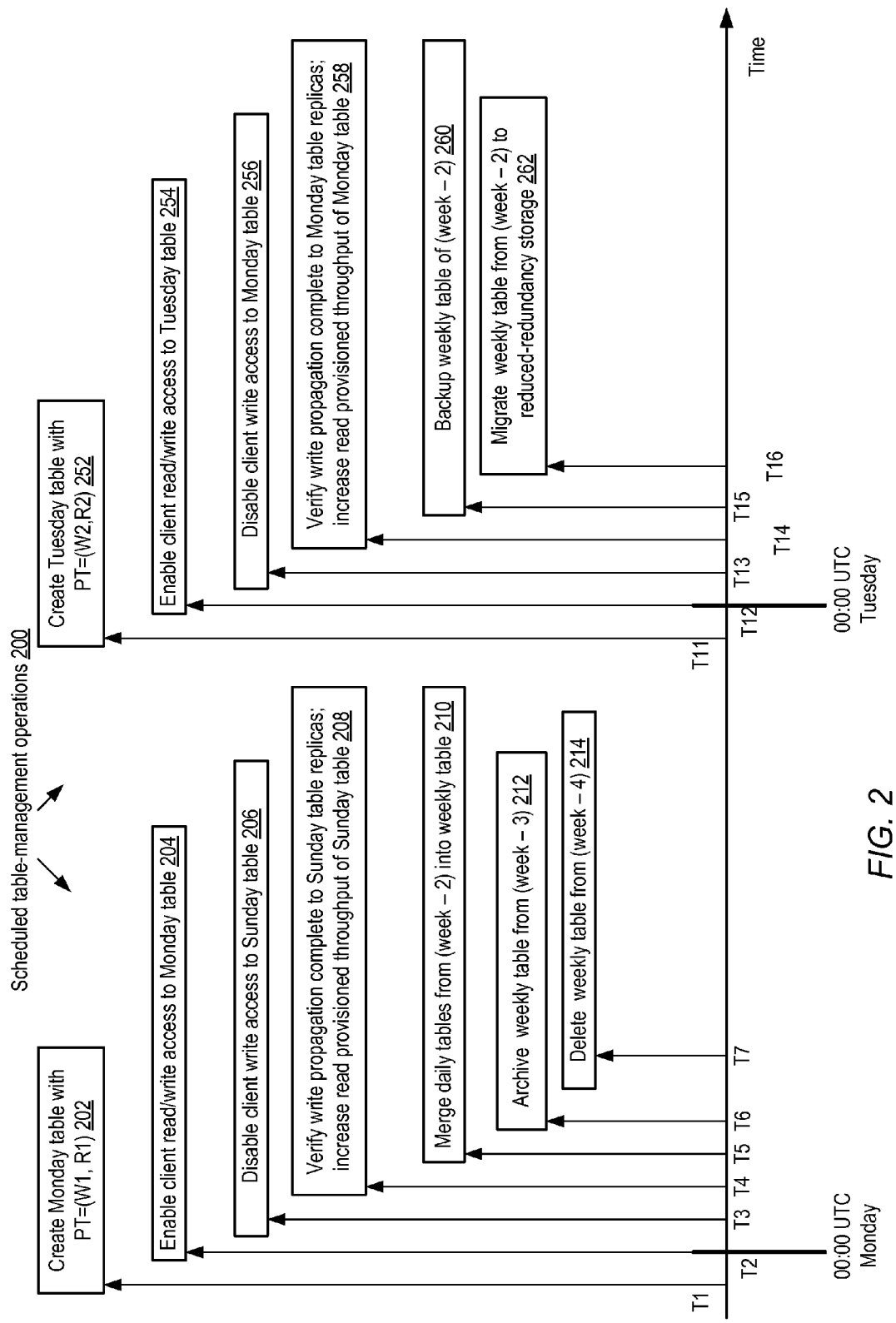
FIG. 2 illustrates an example timing sequence of table management operations that may be scheduled at a database service, according to at least some embodiments.

FIG. 2 illustrates an example timing sequence of table management operations that may be scheduled at a database service that supports time-series tables, according to at least some embodiments. Time increases from left to right in the illustrated sequence. A number of example scheduled table management events 200 are shown. It is noted that the time differences between different events are not drawn to scale, so that, for example, the operations shown at times T2, T3 and T4 may occur near-simultaneously, and similarly, the operations shown at times T12, T13 and T14 may also occur in very close succession. In the example scenario illustrated, a new time series table is created once a day, and configuration changes to earlier tables are implemented at least on some days. At time T1, shortly before 00:00 UTC on a Monday, the database service creates a table called "Monday table", as indicated by element 202. The Monday table is initially configured with a provisioned throughput PT=(W1, R1), i.e., a write provisioned throughput of W1 writes/second, and a read provisioned throughput of R1 reads/second. The Monday table is not immediately released for client access at T1; instead, it is prepared (e.g., storage nodes and devices for the various partitions of the Monday table are found, and the partitions initialized) ahead of the time at which the table is expected to "go live" or made accessible to clients in accordance with the corresponding TSM 175. In some embodiments, a TSM 175 may include an indication of how much earlier than the release time a given TST should be prepared or initialized.

At time T2, e.g., at around 00:00 UTC Monday, the Monday table is made accessible for reads and writes, as indicated by element 204. After T2 (and until T13), read and write requests directed at the Monday table are accepted or rejected based on the provisioned throughput constraints (W1, R1), e.g., in some implementations, reads may be accepted as long as the arrival rate for reads is at or below R1, and writes may be accepted as long as the arrival rate for writes is at or below W1.

In the depicted embodiment, writes to the time-series tables of which the Monday table is a member are expected to be directed to the current (i.e., most-recently-created) TST. Accordingly, shortly after a new TST such as the Monday table is made accessible to clients, writes to the previous TST (e.g., a Sunday table whose creation is not shown in FIG. 2) may be disabled, as indicated by element 206. In some embodiments, the events shown at times T2 and T3 may be performed concurrently, i.e., as part of a single operation. Writes to a given TST may be disabled in some embodiments simply by changing the write provisioned throughput to zero; in other embodiments, writes may be disabled by notifying an admission control module at a storage node to reject further writes, or by notifying a front-end node such as a request router 186 to redirect further writes to a different TST. It is noted that in some database systems, storage may typically be configured in "write-once" mode—e.g., any new logical update to a targeted object such as a row of a table may result in a new physical version of the object being written, rather than an existing physical version being updated in place. In such write-once environments, an update to a table row may be the equivalent of adding a new row to the table. Thus, even if a given row RowK was initially created on Sunday and thus written to a Sunday table, any updates to RowK would result in writes to the Monday table in the example of FIG. 2.

In some embodiments, as mentioned earlier, multiple replicas of a table's partitions may be stored in accordance with data durability requirements. In some such replicated environments, writes targeted at a given partition may first be implemented at one particular replica (which may be termed a "write-initiator" or "master" replica), and then propagated to the remaining replicas. In such an embodiment, even after client writes are disabled to a given TST, it may take some time before all the writes are propagated and applied to a sufficient number of replicas for the desired durability. Accordingly, in FIG. 2, at time T4, the database service may verify that all the writes to the Sunday table have propagated to the desired number of replicas (element 208), and/or that no writes remain outstanding. In addition, in the depicted embodiment, the read provisioned throughput of the Sunday table may be increased, e.g., on the assumption that analysis of the data created/modified on Sunday (and thus stored in the Sunday table) may result in more reads being directed to the Sunday table on Monday.

In addition to creating new tables and modifying the throughput constraints on older tables, the schedule being implemented in FIG. 2 may include other types of operations. For example, at time T5, the set of daily tables of two weeks earlier (e.g., the Monday, Tuesday, Wednesday, Thursday, Friday, Saturday and Sunday tables created starting two Mondays earlier) may be merged into a single weekly table, as indicated by element 210. At time T6, the weekly table from three weeks earlier may be archived (element 212), e.g., by transferring the table to a different type of storage device than was previously used for it. At time T7, the weekly table that is now 4 weeks old may be deleted from the system (element 214). Thus, in the depicted embodiment, only four weeks of data corresponding to the illustrated time-series may be retained—initially in the form of daily tables, and later in the form of weekly tables, before eventual deletion.

Just before 00:00 UTC Tuesday, at time T11, a new "Tuesday table" may be created and initialized, as indicated by element 252, in a manner similar to the way the Monday table was created 24 hours earlier. The provisioned throughput settings (W2,R2) of the Tuesday table may differ from the settings that were used for the Monday table in some cases, e.g., in accordance with the time-series metadata 175 being used. In some cases W2 may be set equal to W1, and/or R2 may be equal to R1. The Tuesday table may be made accessible to clients at time T12 (element 254). Client writes to the Monday table may be disabled at time T13 (element 256). Write propagation verification may be completed for the Monday table at T14 (element 258), and the read provisioned throughput of the Monday table may be increased. A backup of the weekly table created as a result of the merge operation of element 210 may be initiated at T15 (element 260), and the weekly table may be moved to a different types of storage with different durability characteristics at T16 (element 262) in the depicted example.

It is noted that in a given embodiment, various other table management operations (not shown in FIG. 2) may be performed on the time-series of which the Monday table and the Tuesday table are members in accordance with the TSM 175 in effect, and not all the types of operations shown in FIG. 2 need be performed for every time-series. It is also noted that at least in some embodiments, not all the operations may be specified with specific times as the triggering conditions— some operations may be specified with exact timing information (e.g., "start creating the Monday table at 23:45 on Sunday"), while the timing of other operations may be specified conditionally (e.g., "increase the read throughput capacity of the Monday table if and only if all the writes have been propagated to at least three replicas" or "increase the read throughput capacity of the Tuesday table if and only if the number of reads directed at the Monday table during the last 24 hours exceeded X"). In at least some embodiments, clients may be notified regarding at least some table management operations of the types illustrated in FIG. 2, e.g. either in advance, after the fact, or both in advance of and after the operations are completed. Such types of notifications may themselves be included in the schedules generated in some embodiments.

Time-Series Creation

Figure 3:
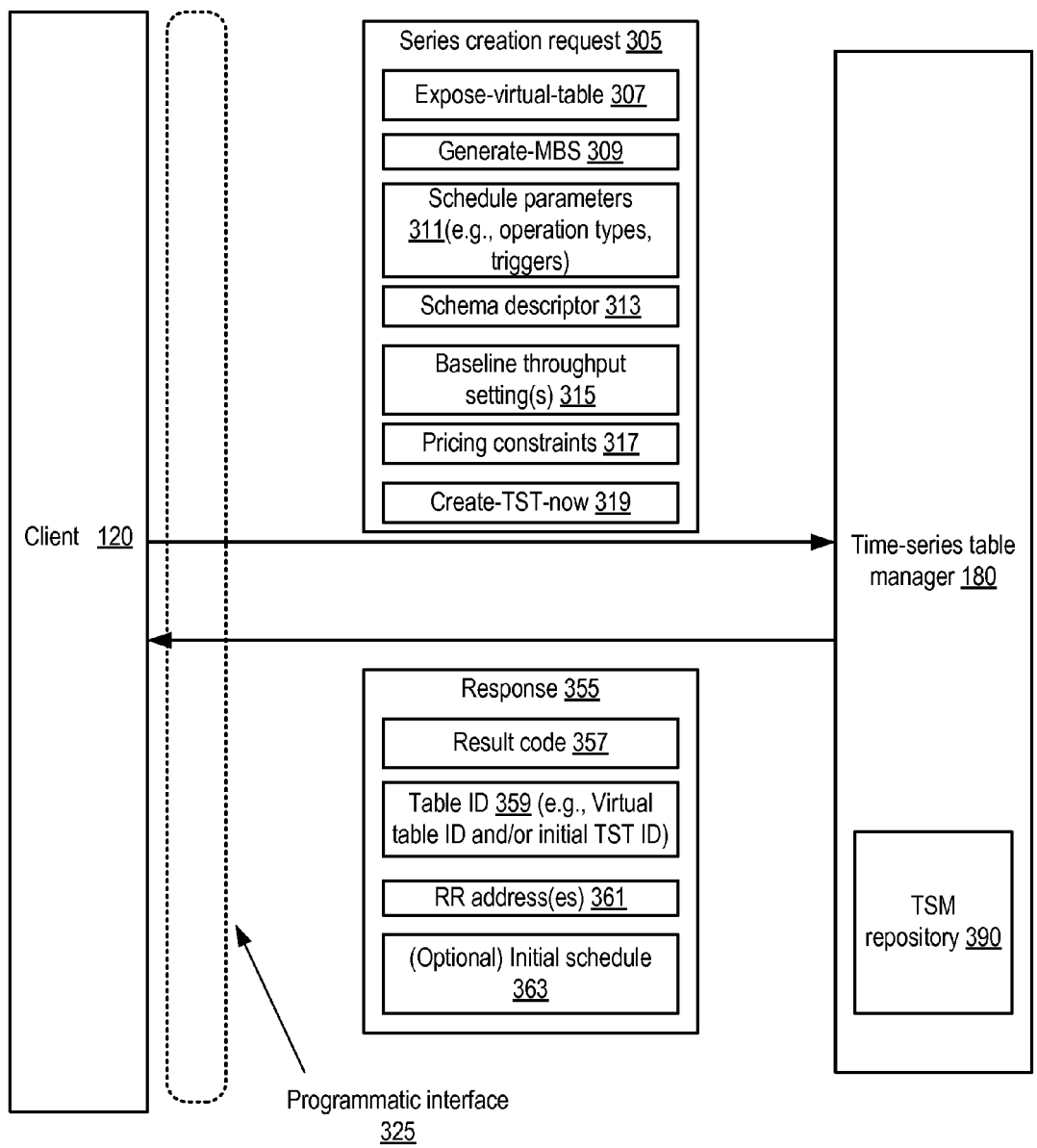
FIG. 3 illustrates example interactions between a client and a time-series table manager, according to at least some embodiments.

FIG. 3 illustrates example interactions between a client and a time-series table manager, according to at least some embodiments. As shown, one or more programmatic interfaces 325, such as a set of application programming interfaces (APIs), a web site, a graphical user interface (GUI), or a command-line tool may be implemented by the TST manager 180 to enable clients 120 to submit requests related to time-series tables (or to table series in general). A given client 120 may submit a time-series creation request 305 to the TST manager via one of the programmatic interfaces, and receive a response 355 from the TST manager.

As shown, the time-series creation request 305 may include one or more request parameters or fields in the depicted embodiment, at least some of which may be used by the TST manager 180 to generate a time-series metadata object 175, and/or a corresponding schedule of table management operations, on the client's behalf. The TSM 175 and/or the schedule may be stored in TSM repository 390 (which may for example itself comprise one or more tables of the database service 102). In some embodiments the client may include a parameter (e.g., "expose-virtual-table" parameter 307) indicating that a virtual table identifier should be provided to the client for targeting work requests, without the client necessarily needing to keep track of the individual identifiers of the TSTs generated. The time-series creation request may include a parameter (e.g., "generate-MBS" parameter 309) requesting the automated generation of metrics-based schedules for the time-series, to be used either in addition to a client-specified schedule, or instead of a client-specified schedule. Thus, time-series schedules may be generated based on a combination of client-specified preferences and service decisions in at least some embodiments. In response to receiving a request with the generate-MBS parameter set affirmatively, the TST manager 180 may configure the metrics-based schedule generator 182 to start collecting metrics from a relevant set of tables and resources (if the metrics were not already being collected) and/or from table history manager 188, so that a schedule based on one or more optimization criteria can be established on behalf of the client.

In at least some embodiments, the client 120 may indicate various schedule parameters 311 for the time-series within the time-series creation request 305. Schedule parameters 311 may indicate, for example, the types of table management operations to be included in a schedule for the time-series (e.g., "create new table", "change read throughput setting", etc.) as well as the triggering conditions (e.g., "every night at 23:45 UTC", or "as soon as all in-flight writes have propagated to at least three replicas") to be used to decide when each of the table management operations is to be initiated. In at least some embodiments, the triggering conditions may be based on table properties (e.g., "create a new table when the size of the most-recently-created table of the series reaches 100 GB", or "create a new table when the number of rows of the most-recently-created table reaches 10000000"). In one embodiment, triggering conditions that require analysis of table contents may be specified—e.g., "create a new table when the sum of the values stored in column X of the most-recently-created table reaches 10000" or "create a new table when a row is added to the most-recently-created table with a value greater than V in column X". A schema descriptor 313 may indicate the virtual schema that is to be used to determine the actual schema requirements of each of the time-series descriptors. For example, in one implementation the schema descriptor 313 may indicate that each row of each time-series table must have a particular column for storing a sequence number indicative of when the row was last written to. Various other types of schema constraints may be indicated in the schema descriptor 313 in other embodiments, including indications of what data types are allowed, how many columns of each data type are allowed, the ordering of columns relative to each other, and so on. Indications for how strictly various schema constraints are to be applied may also be included in the schema descriptor—e.g., some schema constraints may be specified as "must-have", while others may be labeled "optional".

In at least some embodiments, a client 120 may also be able to provide an indication of the baseline throughout settings 315 for at least some of the time-series tables 150 to be created, such as for example the initial read provisioned throughput, the initial write provisioned throughput, an initial burst-mode throughput limit, an initial burst-mode write throughput limit, and so on. (The burst-mode throughput limits may be used to determine whether and for how long short-term bursts of read or write activity above the provisioned throughput limits are to be supported, for example). The schedule parameters 311 that involve throughput setting changes may be expressed relative to the baseline throughput settings in some implementations, e.g., if the baseline read throughput setting is 500 reads/second, a schedules operation may be specified in relative terms such as the logical equivalent of "set the read throughput setting to half the baseline value". In at least some embodiments, clients may specify pricing constraints 317 in the create time-series request, such as a maximum client budget available for implementing the time series, which may also be useful to the time-series table manager 180 in determining the types of resources to be used for the client's tables, and the timings of various table management operations. A "create-TST-now" parameter 319 may indicate that the first time series table is to be created immediately, rather than for example waiting in accordance with other schedule parameters 311.

In response to receiving the time-series creation request 305, the TST manager 180 may generate a corresponding time-series metadata object 175 and store the metadata in repository 390. A corresponding schedule may also be generated and stored in some embodiments. In at least some embodiments, the first TST 150 of the requested time-series may be created and/or initialized, either in response to the create-TST-now parameter setting, or in accordance with schedule parameters 311. A response 355 may be provided to the client 120 in some embodiments. The response 355 may include a result code 357 indicating whether the requested TSM 175 was successfully created, or whether an error occurred. In some implementations, the response 355 may include a table identifier 359, e.g., an identifier of the first TST of the time-series, an identifier of the virtual table established on behalf of the client, or both the TST identifier and the virtual table identifier. In some embodiments, the response 355 may include one or more request router addresses 361 indicating the particular front-end nodes to which the client 120 should submit work requests targeted at the time-series tables. In one embodiment the response 355 may include a representation of an initial schedule that the TST manager 180 generated, based at least in part on the client's preferences indicated in the time-series creation request 305. The initial schedule may be provided, for example, to ensure that the client 120 is able to review at least the first few table management operations to be performed on behalf of the client. In some cases the client 120 may be asked to approve the initial schedule, e.g., via another communication sent using one of the programmatic interfaces 325. In different embodiments, the time-series creation request 305 and/or the response 355 may include other elements, different from those shown in FIG. 3, or some of the illustrated elements may be excluded.

Time-Series Table State Transitions

Figure 4:
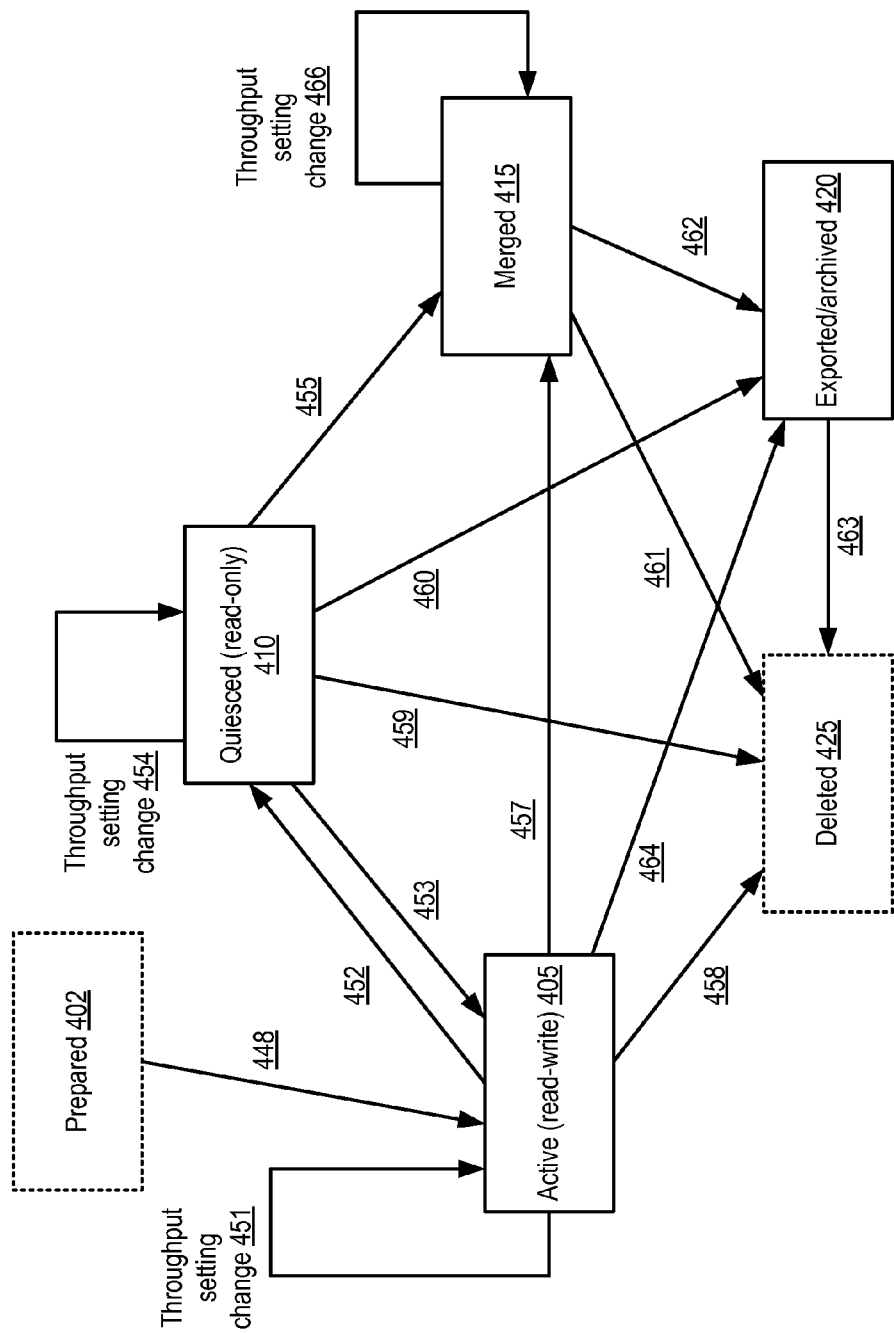
FIG. 4 illustrates an example set of state transitions supported by a provisioned-throughput database service implementing time-series tables, according to at least some embodiments.

FIG. 4 illustrates an example set of state transitions supported by a provisioned-throughput database service implementing time-series tables, according to at least some embodiments. A given TST 150 associated with a TSM 175 may be in one of the states shown in FIG. 4 at a given point in time in the depicted embodiment; in other embodiments, fewer states may be defined (e.g., the "merged" state of FIG. 4 may not be considered a separate state), or more states may be defined. A table management operation included in the schedule generated in accordance with the TSM 175 may result in a change to the state of the TST. For some of the illustrated states in the depicted embodiment, such as the active (read-write) state 405, the quiesced (read-only) state 410, and the merged state 415, a change to a throughput setting of the table (e.g., a change to a read provisioned throughput or to a write provisioned throughput) may itself be considered a minor state change, while transitions between the named states 402, 405, 410, 415, 420 and 425 may be deemed major state changes.

In at least some embodiments, a TST 150 may be considered to be in a prepared state 402 between the time at which the TST is created, and the time at which the table is made accessible to client work requests. In the timeline shown in FIG. 2, for example, the Monday table may be deemed to be in prepared state 402 between T1 and T2. A time-series table 150 may enter active state 405 when it is made accessible to client work requests (e.g., in the example shown in FIG. 2, the Monday table may be deemed to enter active state 405 at time T2). In some embodiments, a TST may immediately enter active state 405 upon creation, i.e., TSTs need not pass through the prepared state 402 in at least some embodiments. An initial throughput setting may be associated with the TST in active state, such as a provisioned throughput for reads and/or writes. The initial throughput setting may be used to implement admission control for client work requests, including read requests and/or write requests, directed at the TST. Depending on the schedule generated for the TSM 175 applicable to the TST 150, in some cases the throughput settings alone may be changed based on triggering conditions or events, as indicated by arrow 451. That is, the TST 150 may remain accessible for both reads and writes as a result of transitions 451, but the throughput constraints that control the rates at which reads and writes are permitted may change.

A TST in active state 405 may move to a quiesced or read-only state 410 via transition 452 in the depicted embodiment. After this change is made, reads may be permitted as long as the TST remains in quiesced state, but writes may not be permitted. Transitions back to the active state 405 may be permitted from the quiesced state in some embodiments, as indicated by arrow 453. Furthermore, while the TST remains in quiesced state 410, its throughput settings (e.g., read provisioned throughput) may be changed in accordance with the schedule and time-series metadata, as indicated by arrow 454. In embodiments in which multiple replicas of table content are maintained, and writes have to be propagated from one replica to other replicas, it may take some time after writes are disabled for the in-flight writes to be applied to the required number of replicas. Thus, in such scenarios, writes may be disabled (e.g., by changing the write provisioned throughput to zero) some time before the TST actually enters the quiesced state. A "quiescing" state (not shown in FIG. 4 for clarity) may be defined in some embodiments for TSTs that are awaiting the completion of write propagations.

In some embodiments, groups of TSTs 150 may be combined or merged into a single larger TST based on certain triggering conditions, and such a combination may be considered a state transition to a "merged" state. For example, in FIG. 2, seven daily tables were combined into a weekly table. A TST may enter merged state 415 from either the active state (arrow 457), or the quiesced state (arrow 455) in the depicted embodiment. Reads and/or writes may be permitted on a merged TST, and the throughput settings for reads and/or writes may be changed while the TST remains in its merged state (as indicated by arrow 466).

In at least some embodiments, the rate at which the data in a given table is accessed may taper off over time, or the performance requirements for various operations may become less exacting over time, and as a result, the contents of the table may be archived, or exported in formats other than the original format. Exports may also be used for any of various types of backups in some implementations, including for example partial, incremental, and full backups. Transitions to an exported/archived state 420 may occur from either the active state 405 (arrow 464), the quiesced state 410 (arrow 460), or the merged state 415 (arrow 462) in the depicted embodiment, in accordance with the schedule and metadata for the time-series. In some embodiments, throughput settings may be changed for a TST in exported/archived state 420 as well; in other embodiments, such throughput-related changes may not be supported. Finally, in at least some embodiments, the contents of a table may eventually be deleted in accordance with the schedule. The TST may enter the deleted state 425 from several of the other states in the depicted embodiment, such as the active state, the quiesced state, the merged state, and the exported/archived state. As noted above, some of the states and/or state changes illustrated in FIG. 4 may not be supported in various embodiments, while additional states and/or state transitions may be allowed in other embodiments. For example, in some embodiments, operations to split tables may be supported, operations to perform specified types of data transformations or computations on table data may be supported, operations to conditionally delete some subset of table data may be supported, and/or index creation/deletion/rebuild operations may be supported.

Schemas for Time Series Tables

Figure 5:
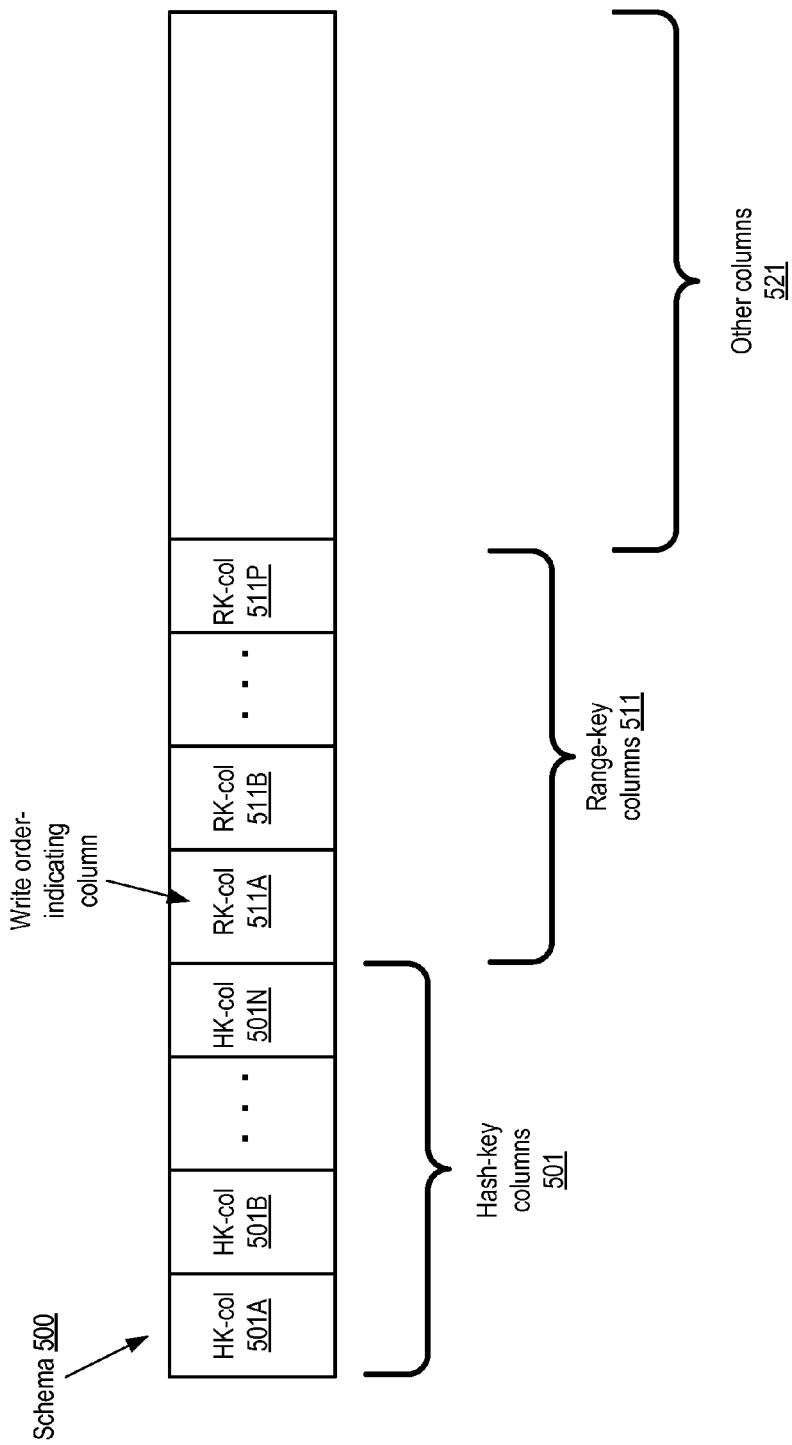
FIG. 5 illustrates an example of a schema that may be implemented to support efficient access to database tables for time-oriented queries, according to at least some embodiments.

Time-series tables of the kind described above may be implemented within several different kinds of database systems, including for example non-relational database systems that may not typically impose significant restrictions on table row design (although in some non-relational systems, a set of columns to be used for the primary key may be required as the first column or columns of each row). Other types of database systems, including relational or object-oriented databases, may implement time-series tables as well. In at least some embodiments, the contents of the time-series tables may be required to conform to a set of schema rules. The schema rules may be enforced, for example, to enable efficient execution of various time-range-related queries, such as the logical equivalents of queries like "list the changes to table T1 that have occurred in the last four hours" or "which rows of table T2 were modified between Jan. 1 and Jan. 8 2013?". FIG. 5 illustrates an example of a schema that may be implemented to support efficient access to database tables for time-oriented queries, according to at least some embodiments.

According to the depicted schema 500, some number of columns may be required for a hash-based key (such as the primary key) of a time-series table 150. Hash-key columns 501, such as HK-col 501A, 501B, . . . , 501N, may, in various combinations, form one or more hash-based keys for the table. In some embodiments, restrictions may be placed on the maximum number of hash key columns, while in other embodiments, no limit of the maximum number of columns used for the hash key may be imposed. In addition, in accordance with schema 500, one or more range-key columns 511 may be required for time-series tables in the depicted embodiment, such as columns RK-col 511A, 511B, . . . , 511P. In at least one embodiment, at least one of the range key columns 511 (such as RK-col 511A) may be set up to store a value indicative of an order in which writes occurred at the time-series table. For example, whenever a row is written to the table, a timestamp may be generated and stored in the RK-col 511A column of the row, or a sequence number may be generated for RK-col 511A. The exact format of the data stored in the column used for indicating write time order may be left up to the client in some embodiments, and may be explicitly controlled by the service in other embodiments. In at least some embodiments, the database service may automatically generate the contents of at least one range-key column. A plurality of range-keys may be defines using various combinations of one or more range keys in the depicted embodiment. In some embodiments, as mentioned earlier, the database may implement a write-once storage model, such that updates to a row always result in a new row being inserted into a table, and no physical writes are performed on existing rows. In some implementations, a limit may be placed on the number of range key columns 511 that can be included; in other implementations, no such limits may apply. In some embodiments, the schema rules may also specify required data types (e.g., long integers) of at least some of the range key columns and/or some of the hash key columns. In addition to the hash key columns and the range key columns, time series tables 150 may also include other columns 521 in various embodiments. In at least some embodiments, no hash-key columns may be required. In other embodiments, no range-key columns may be required.

For certain types of applications in which the importance of (e.g., the rate of access to) data is a function of how recently the data was written, schemas similar to that shown in FIG. 5 may help the database system achieve fast response times to time-based queries. For range queries based on write times, requiring the write-ordering column as indicated in FIG. 5 may also lead to more queries being satisfied with efficient sequential reads rather than random reads, which are often less efficient than sequential reads. As described earlier, a representation of schema 500 (or rules that correspond to the column arrangements of schema 500) may be included in time-series metadata objects 175 in some embodiments. Schema requirements may not be imposed on time-series tables in some embodiments. In some embodiments in which a non-relational database is used, different rows of the time-series tables may have different sets of columns, as long as any applicable schema rules are followed.

Methods for Implementing Time-Series Tables

Figure 6:
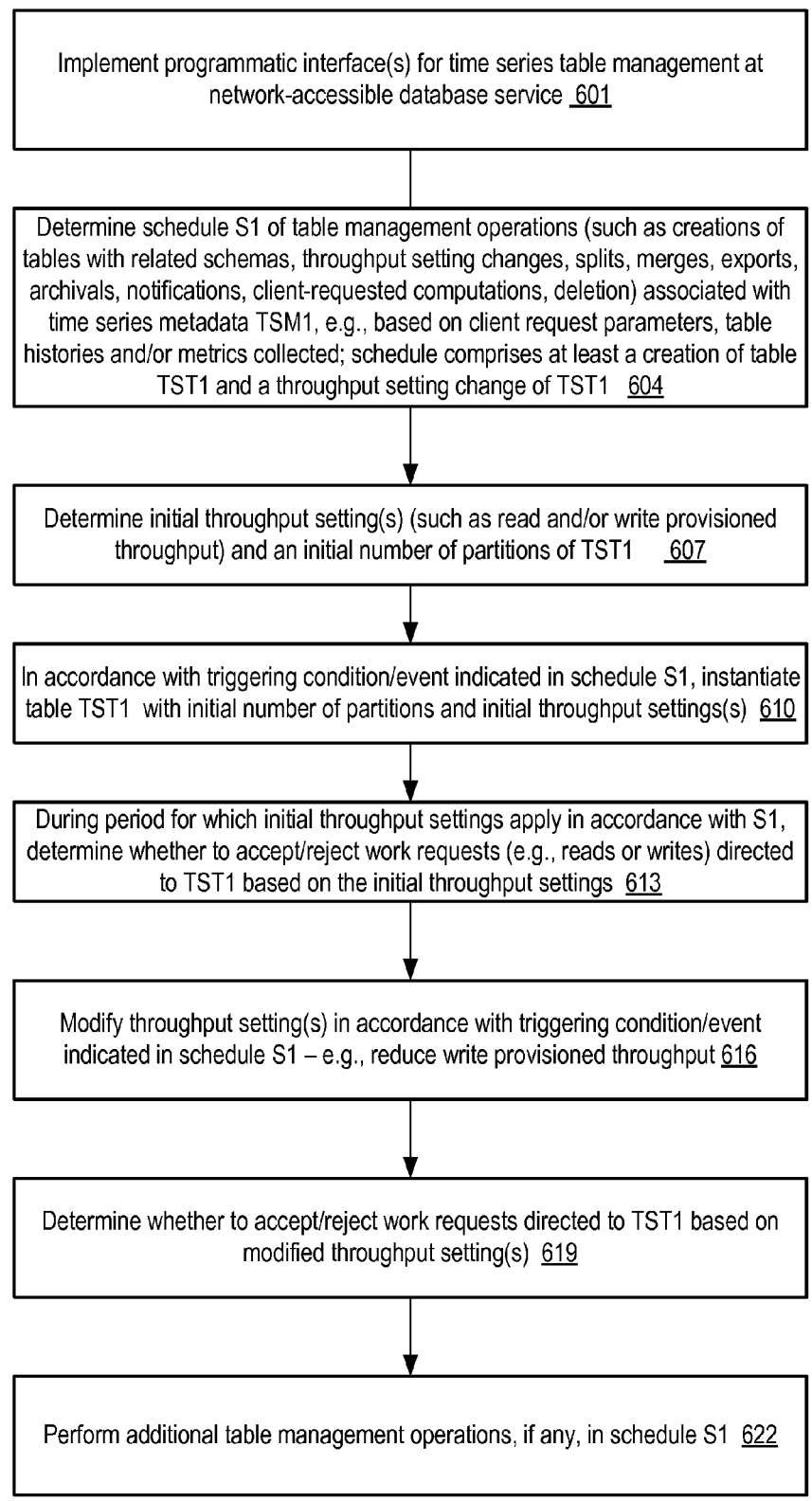
FIG. 6 is a flow diagram illustrating aspects of operations that may be performed to implement times series table management operations, according to at least some embodiments.

FIG. 6 is a flow diagram illustrating aspects of operations that may be performed to implement times series table management operations, according to at least some embodiments. As shown in element 601, one or more programmatic interfaces, such as application programming interfaces (APIs), web pages, graphical user interfaces, or command-line tools, may be implemented for time-series related interactions at a network-accessible database service. A schedule S1 of table management operations associated with time-series metadata may be generated (element 604), e.g., in response to a client request received via one of the programmatic interfaces, or based on collected metrics and/or history records. The metadata itself may include various types of elements, including schema requirements, initial throughput settings for various time-series tables, initial number of partitions of the tables, client budget limits, and the like.

The schedule S1 may comprise a variety of table management operations to be performed based on specified triggering conditions, including for example table creations, changes to table throughput settings, table merges/splits, exports, archive operations, client-requested data transformations or computations, index-management operations, partial (e.g., conditional) table deletes, full table deletes, notifications regarding other upcoming or completed table management operations, and the like. A particular table management operation may be triggered based on time alone (e.g., a client may specify specific points in time at which one or more of the operations are to be performed, or intervals between specified table management operations), or may be dependent on other factors such as the completion of certain types of operations, the rate at which reads or writes occur at the table, table properties such as size, table contents, and so on. In the depicted embodiment, a given schedule may include one or more table creation operations and one or more throughput setting changes. Tables may have any combination of several types of throughput settings or constraints in different embodiments, any of which may be changed in accordance with the schedule. For example, in an embodiment in which a provisioned-throughput model is use, each table (or each table partition) may have an associated provisioned throughput setting, which may correspond to a rate at which work requests (such as reads or writes) are expected to be performed under most operating conditions. If a partition P1 of table T1 has a provisioned throughput of R reads/second and W writes/second, the database system would typically be obligated to accept and satisfy up to R read requests per second, and up to W write requests per second. (In some implementations, the average sizes of the reads and/or writes, or some distribution of expected sizes, may be indicated in the provisioned throughput, along with the rates.) If work requests arrive at rates higher than the provisioned throughput, the service may reject the requests instead of accepting them for execution. In some embodiments of provisioned-throughput systems, burst-mode throughput settings may also be used, which indicate the extent to which (and/or the conditions under which) bursts of work requests at higher rates than the provisioned throughput may be supported by the service. For example, in accordance with a particular burst-mode setting, the database service may make a best effort to accept bursts of up to 1000 reads per second, for up to a maximum of 5 seconds, even if the provisioned throughput for reads was 500 reads per second. Either the provisioned throughput settings, or the burst-mode throughput settings, or both, may be changed for various time-series tables in accordance with schedule S1 in some embodiments. In some implementations, the schedules may be stored as part of the time-series metadata.

The initial throughput settings, and an initial number of partitions, of a particular time-series table TST1 may be determined according to the metadata and schedule S1 (element 607). In accordance with a triggering condition indicated for the TST1's creation, the table may be instantiated with the initial throughput settings, the initial number of partitions, as well as other properties indicated in the metadata (e.g., in compliance with the schema requirements indicated in the metadata). TST1 may then be made accessible for operations corresponding to client work requests, such as reads and writes. In embodiments in which table states similar to those illustrated in FIG. 4 are implemented, TST1 may enter the "active" state.

For the length of time between the detection of the first triggering condition (which led to the instantiation of TST1 with the initial throughput settings) and the detection of a different triggering condition that results in a change to the throughput settings, admission control decisions (e.g., decisions as to whether to accept or reject an incoming work request) may be made in accordance with the initial throughput settings (element 613). The throughput settings may then be modified (element 616), in accordance with S1—for example, the write provisioned throughput may be reduced Subsequent admission controls decisions may be made on the basis of the changed throughput settings in the depicted embodiment (element 619). Additional table management operations, if any are included in the schedule S1, may be implemented in accordance with the detection of their respective triggering conditions or events (element 622). It is noted that at least in some embodiments, clients may also request table management operations that are not currently included in a schedule—e.g., even though the next table in a time-series may be scheduled to be created at time X, the client on whose behalf the time-series is being implemented may request that the next table be created at time Y, which may be earlier than X. Thus, in such embodiments, clients may be able to override and/or edit time-series schedules.

Figure 7:
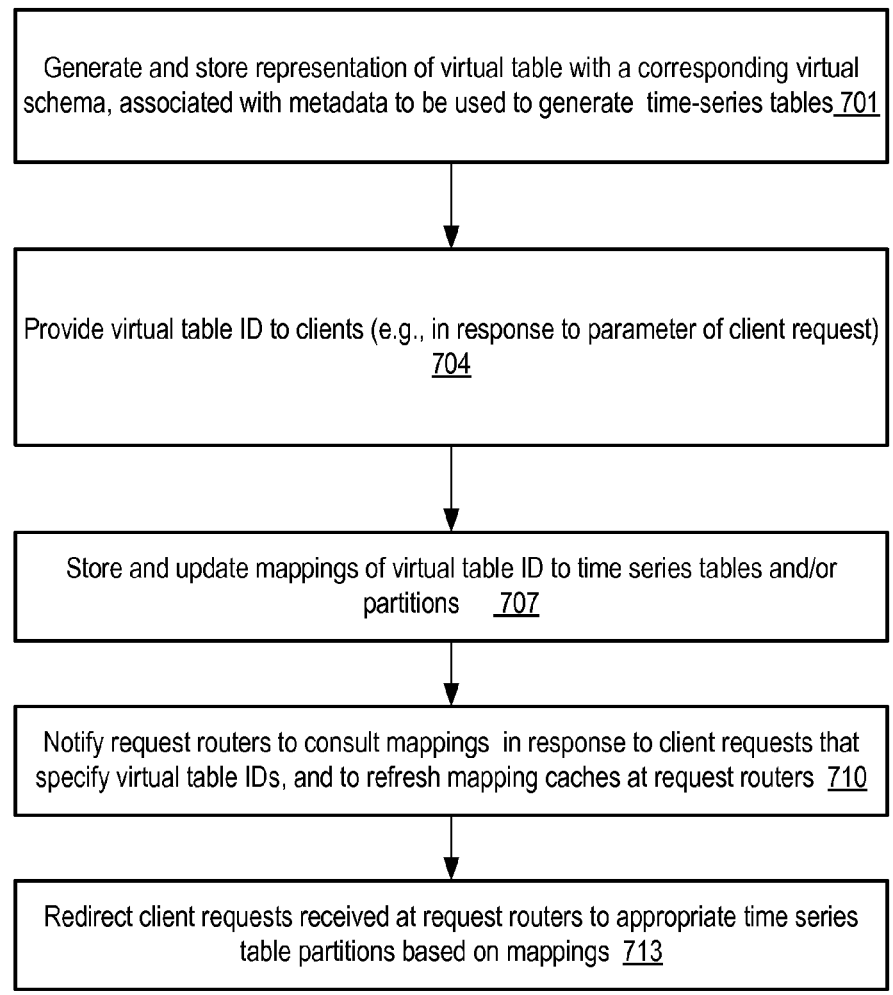
FIG. 7 is a flow diagram illustrating aspects of operations that may be performed to implement virtual tables for which work requests are directed to selected time period tables, according to at least some embodiments.

FIG. 7 is a flow diagram illustrating aspects of operations that may be performed to implement virtual tables for which work requests are directed to selected time period tables, according to at least some embodiments. As described earlier, a virtual table may represent a mechanism that enables clients to submit work requests, without having to learn the identifier of each of the tables of the time-series, with the assurance that their request will be directed by the database service to the appropriate one of the time-series tables. As shown in element 701, a representation of a virtual table together with a corresponding virtual schema (or rules governing a virtual schema) may be generated and stored, together with or as part of a particular time-series metadata object 175. The representation may include an identifier of the virtual table, which may be provided to a client on whose behalf the time-series is being implemented (element 704). In some embodiments, the client may request a virtual table identifier in a time-series creation request, as described above with reference to FIG. 3. It is noted that not all the time-series tables that are created in a given implementation may have corresponding virtual tables.

Mappings between the virtual table identifiers and the corresponding time-series tables or partitions may be stored and updated as various table management operations are performed in accordance with the metadata, e.g., by TST manager 180 (element 707). In at least some embodiments, front-end elements of the database service such as request routers 186 may be notified regarding the mappings and/or updates to the mappings, to enable the routing of client requests that use virtual table identifiers to indicate the targets at which the requested operations are to be performed (element 710). In some implementations, the request routers 186 may maintain caches of the mappings between the virtual tables and the corresponding time-series tables or partitions, and the caches may be updated as needed. When a request router receives a work request specifying a virtual table as its target, the request may be routed to the appropriate time-series table based on the mappings (element 713). For example, a set of virtual table mappings VTM1 may indicate that writes received after time T should be directed to TST partition A located at storage node SN2, while read queries for time range T2-T3 should be directed to partition K located at storage node SN4. It is noted that in at least some embodiments, clients may choose to indicate, for a given work request such as a read or a write, either a virtual table identifier or an identifier of a specific TST as the intended target of the work operation.

Figure 8:
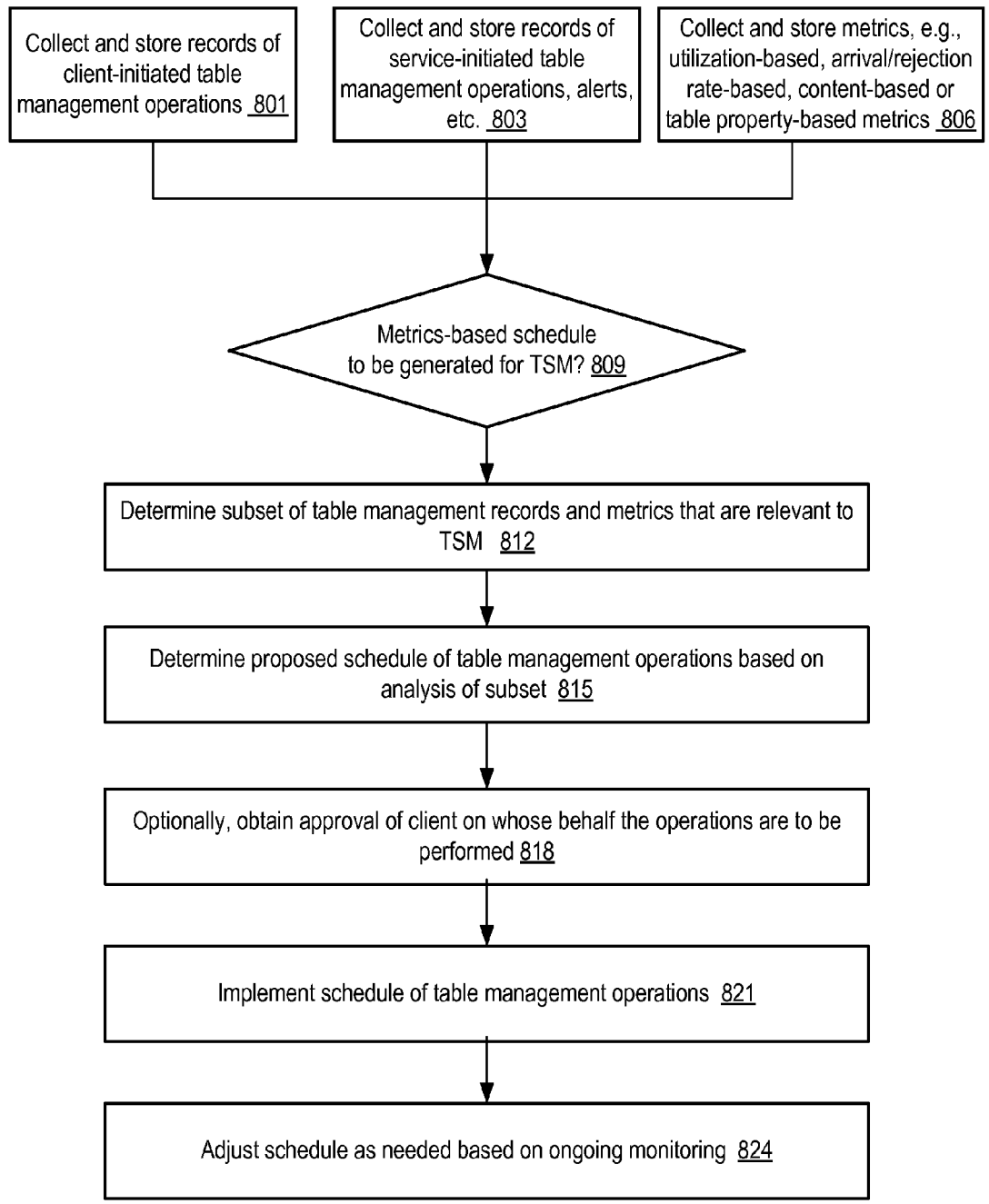
FIG. 8 is a flow diagram illustrating aspects of operations that may be performed to implement metrics-based schedules for time-series tables, according to at least some embodiments.

In some embodiments, as mentioned earlier, at least some portions of the schedules for time-series table management operations may be generated based on collected metrics and/or records of earlier table management operations. FIG. 8 is a flow diagram illustrating aspects of operations that may be performed to implement metrics-based schedules for time-series tables, according to at least some embodiments. Several different types of inputs may drive the schedule generation process in the depicted embodiment. As shown in element 801, records of client-initiated table management operations, such as table creations, throughput setting changes, table deletions and the like may be collected (e.g., by table history manager 188) for various kinds of tables, including standalone tables and time-series tables. In addition to records of client-initiated operations, records of service-initiated table management operations and/or alerts may also be collected (e.g., also by table history manager 188) in the depicted embodiment, as shown in element 803. Alerts may include indications of when and if throughput setting limits were reached on various tables, for example, or when new partitions had to be added as writes directed to the tables were received, or when one or more replicas of a partition became unavailable or inaccessible. In at least some embodiments, as mentioned earlier, programmatic interfaces may be implemented to allow clients to view table management history event records, including records of both service-initiated table management operations and client-initiated operations. In addition to records of table management operations, resource usage metrics (such as storage device utilization levels, latencies, CPU utilization levels, memory utilization levels, network utilization levels, and the like) may also be collected (element 806), together with work request arrival rate metrics and work request rejection rate metrics. In some embodiments, at least some of the metrics collected in operations corresponding to element 806 may include table properties (e.g., table sizes, either in physical units such as megabytes or gigabytes, or in logical units such as the number of rows). In one embodiment, content-based metrics may be used—e.g. a metric such as the highest value inserted for a given column in a table may be tracked and used to generate scheduled operations.

If a metrics-based schedule is to be generated corresponding to a given time-series metadata object 175, as detected in element 809, the TST manager 180 (e.g., using its metrics-based schedule generator subcomponent 182) may identify the subset of the table management records and metrics that are relevant to the TSM 175 (element 812). For example, a subset of table management history records and/or metrics for tables similar in one or more respects to the TSTs indicated by the TSM 175 may be selected for analysis. The similarity criteria used for such a subset selection may include, for example, hints or suggestions provided by clients (e.g., a client may provide an indication of a standalone table 145 or a different TST 150 that could be used as a model for generating the schedule), a determination of common ownership, a determination of similar expected workloads, similar table sizes, and the like.

A proposed schedule of table management operations may then be generated based on the selected subset of records and metrics (element 815). In some embodiments, the proposed schedule may be provided to the client, e.g., to obtain the client's approval (element 818). The schedule may then be implemented (element 821). In some embodiments, the schedule may be modified over time based on additional metrics or other monitoring (element 824), and/or based on client feedback. In at least one implementation, any of various artificial intelligence techniques may be used to improve existing schedules, as well as to generate higher-quality schedules in view of one or more optimization goals (such as goals to minimize client costs while satisfying at least X % of client requests within a specified response time).

It is noted that in various embodiments, some of the operations illustrated in the flow diagrams of FIGS. 6, 7 and 8 may be performed in a different order than shown, or omitted. In other embodiments, some of the operations shown may be performed in parallel rather than sequentially, or additional operations not shown in the figures may be implemented.

Use Cases

The techniques described above, of supporting configurable-capacity time-series tables, may be useful in a variety of different scenarios. For example, in many applications, the vast majority of read accesses to data may be directed towards the most-recently-generated or most-recently-updated records. In such environments, it may be the case that distributing data updates randomly across partitions or storage devices may be less efficient than grouping updates by time. In addition, the ability to adjust throughput settings automatically as the data ages, or to automatically transition to using less expensive types of storage, may help reduce client costs. Such automated transitions may also be an effective approach in dealing with the huge amounts of streaming data that is often generated in various so-called "Big Data" analysis applications.

Illustrative Computer System

Figure 9:
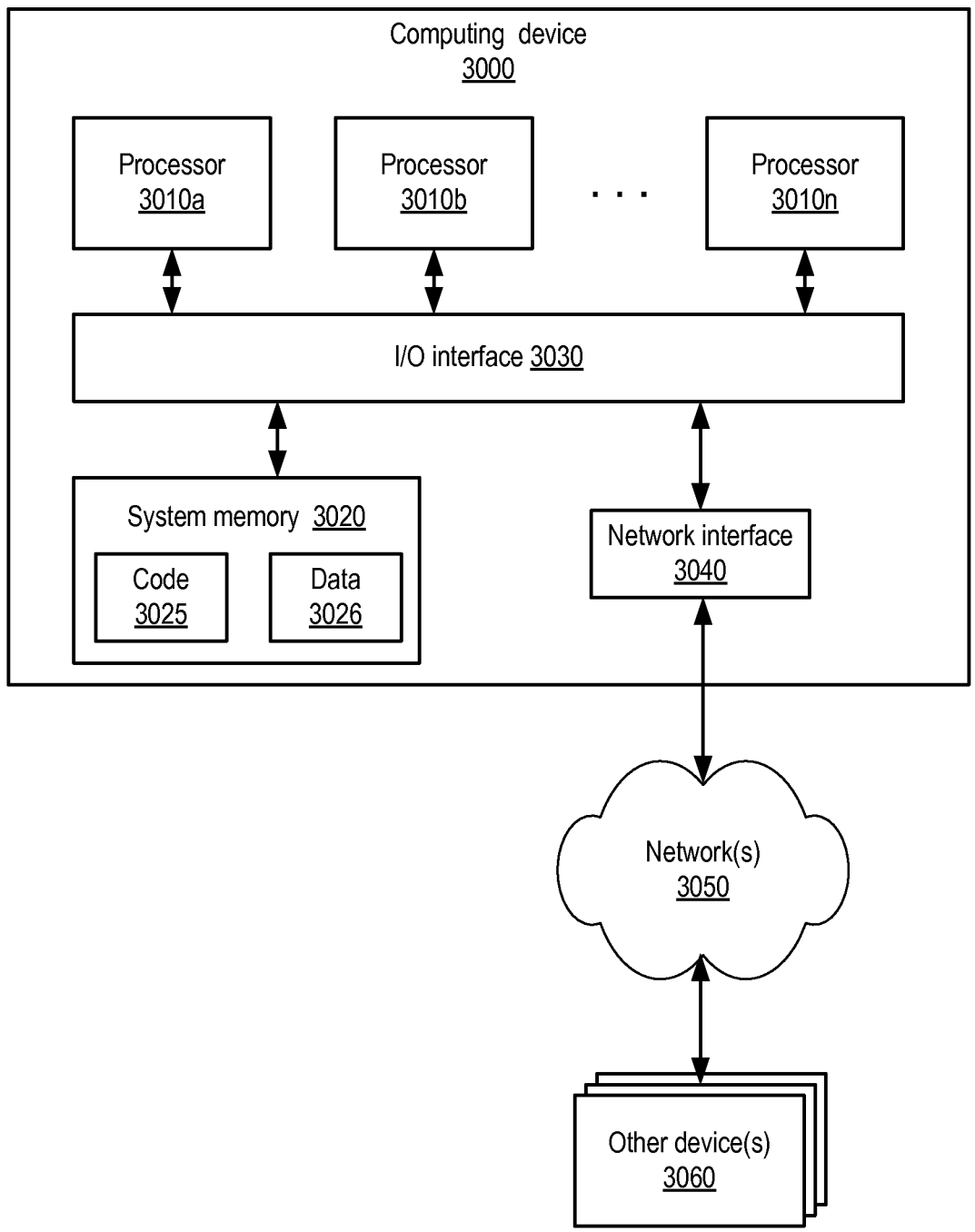
FIG. 9 is a block diagram illustrating an example computing device that may be used in at least some embodiments.

In at least some embodiments, a server that implements a portion or all of one or more of the technologies described herein, including the techniques to implement the TST manager 180, the metrics-based schedule generator 182, the table history manager 188, the request routers 186, and/or storage nodes 115, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
one or more computing devices configured to:
  generate, corresponding to a particular set of table series metadata at a provisioned-throughput database service, a schedule of table management operations to be implemented, wherein the schedule comprises (a) an operation to create an additional table whose schema is indicated by the particular set of table series metadata, wherein the additional table is configured to store data written subsequent to a detection of a first triggering condition, and (b) another operation to change a throughput setting of the additional table in response to a detection of a second triggering condition;
  determine an initial number of table partitions to store the data of the additional table, and an initial throughput setting of the additional table;
  instantiate the additional table in accordance with the schedule, the initial number of table partitions, and the initial throughput setting;
  in response to a particular work request received subsequent to the detection of the first triggering condition and prior to the detection of the second triggering condition, determine whether to accept the particular work request for execution at the additional table based at least in part on the initial throughput setting;
  alter the throughput setting of the additional table to a modified throughput setting in response to the detection of the second triggering condition; and
  in response to an additional work request received subsequent to the detection of the second triggering condition, determine whether to accept the additional work request for execution at the additional table based at least in part on the modified throughput setting.

2. The system as recited in claim 1, wherein the one or more computing devices are configured to generate the schedule based at least in part on one or more parameters indicated in a client request.

3. The system as recited in claim 1, wherein the one or more computing devices are configured to generate the schedule based at least in part on an analysis of metrics collected over a time period.

4. The system as recited in claim 1, wherein the first triggering condition comprises an expiration of a first time interval, and wherein the second triggering condition comprises an expiration of a second time interval.

5. The system as recited in claim 1, wherein the throughput setting comprises a provisioned throughput capacity for a specified type of work operation.

6. A method, comprising:
performing, by one or more computing devices:
generating a schedule of table management operations to be implemented at a database, wherein the schedule comprises (a) an operation to create a particular table to store data written subsequent to a first triggering event, and (b) another operation to change a throughput constraint of the particular table in response to a second triggering event;
determining an initial throughput constraint of the particular table;
instantiating the particular table in accordance with the schedule and the initial throughput constraint of the additional table;
in response to receiving a particular work request subsequent to the first triggering event and prior to the second triggering event, accepting the particular work request for execution at the particular table based at least in part on the initial throughput constraint;
setting the throughput constraint of the particular table to a modified throughput constraint in response to the second triggering event; and
in response to receiving an additional work request subsequent to the second triggering event, accepting the additional work request for execution at the particular table based at least in part on the modified throughput constraint.

7. The method as recited in claim 6, further comprising performing, by the one or more computing devices:
implementing a programmatic interface enabling a client to indicate one or more parameters to be used to generate the schedule.

8. The method as recited in claim 6, wherein the schedule is based at least in part on one or more parameters indicated in a client request.

9. The method as recited in claim 6, further comprising performing, by the one or more computing devices:
collecting one or more metrics from the database over a time period;
wherein the schedule is based at least in part on an analysis of the one or more metrics.

10. The method as recited in claim 6, wherein the first triggering event comprises an expiration of a first time interval, and wherein the second triggering event comprises an expiration of a second time interval.

11. The method as recited in claim 6, wherein the throughput constraint comprises a provisioned throughput capacity for a specified type of work operation.

12. The method as recited in claim 6, further comprising performing, by the one or more computing devices:
storing a metadata object including an indication of a virtual table with a virtual schema, wherein a schema of the particular table is based at least in part on the virtual schema, and wherein a schema of an additional table created in accordance with a third triggering event indicated in the schedule is based at least in part on the virtual schema;
in response to receiving a work request indicating the virtual table as a target, determining to direct the work request to one of: (a) the particular table or (b) the additional table, based at least in part on a time at which the work request was received.

13. The method as recited in claim 12, wherein in accordance with the virtual schema, the schema of the particular table comprises at least one range key indicative of an order in which writes are performed on the particular table.

14. The method as recited in claim 6, further comprising performing, by the one or more computing devices:
storing a representation of a plurality of table management operations performed on the particular table, including at least one table management operation performed at client request and at least one table management request performed by an administrative component of the database without an associated client request;
implementing a programmatic interface enabling a client to request a record of table management operation history associated with the particular table;
providing, in response to a request received via the programmatic interface, an indication of the at least one table management operation performed at according to a client request and at least one table management request performed by an administrative component of the database without an associated client request.

15. The method as recited in claim 14, wherein at least one operation is included in the schedule based at least in part on an analysis of the representation of the plurality of table management operations.

16. The method as recited in claim 6, wherein the schedule comprises at least one of: (a) an operation to merge the particular table with another table, (b) an operation to backup contents of the table, (c) an operation to configure the particular table as a read-only table, (d) an operation to export contents of the particular table in accordance with a specified format, (e) an operation to archive contents of the particular table, (f) an operation to delete the particular table, (g) an operation to split the particular table into a plurality of tables, (h) an operation to send a notification associated with the particular table, (i) an operation to perform a specified type of computation on at least a subset of the contents of the particular table, (j) an operation to delete a portion of the particular table based on specified deletion criteria, or (k) an index-management operation on the particular table.

17. A non-transitory computer-accessible storage medium storing program instructions that when executed on one or more processors:
generate a schedule of table management operations to be implemented at a database, wherein the schedule comprises an operation to change a throughput constraint of a particular table of the database in response to a triggering event;
instantiate the particular table in accordance with the schedule and an initial throughput constraint of the additional table;
in response to receiving a particular work request prior to the triggering event, accepting the particular work request for execution at the particular table based at least in part on the initial throughput constraint;

setting the throughput constraint of the particular table to a modified throughput constraint in response to the triggering event; and in response to receiving an additional work request subsequent to the triggering event, accepting the additional work request for execution at the particular table based at least in part on the modified throughput constraint.

18. The non-transitory computer-accessible storage medium as recited in claim 17, wherein the schedule is based at least in part on one or more parameters indicated in a client request.

19. The non-transitory computer-accessible storage medium as recited in claim 17, wherein the instructions when executed on the one or more processors:

collect one or more metrics from the database over a time period;

wherein the schedule is based at least in part on an analysis of the one or more metrics.

20. The non-transitory computer-accessible storage medium as recited in claim 17, wherein the triggering event comprises an expiration of a time interval, and wherein the throughput constraint comprises a provisioned throughput capacity for a specified type of work operation.

21. The non-transitory computer-accessible storage medium as recited in claim 17, wherein the instructions when executed on the one or more processors:

provide one or more of: (a) an advance notification of an operation included in the schedule to a client or (b) a notification of a completion of an operation included in the schedule to a client.

22. The non-transitory computer-accessible storage medium as recited in claim 17, wherein the instructions when executed on the one or more processors:

receive an indication from a client of a computation to be performed on at least a subset of contents of the particular table in response to a different triggering event;

include an operation representing the computation in the schedule; and in response to a detection of the different triggering event, initiate the computation on the at least a subset of the contents of the particular table.

23. The non-transitory computer-accessible storage medium as recited in claim 17, wherein the triggering event comprises an analysis of at least a subset of contents of the particular table.

* * * * *